United States Patent [19]

Bodor et al.

[11] 4,396,639

[45] Aug. 2, 1983

[54] FAT BLEND SUITABLE FOR REFRIGERATOR-TYPE MARGARINES AND LOW FAT SPREADS

[75] Inventors: Janos Bodor, Voorburg; Cornelis den Hollander, Rotterdam; Robert Schijf, Vlaardingen, all of Netherlands

[73] Assignee: Lever Brothers Company, New York, N.Y.

[21] Appl. No.: 127,662

[22] Filed: Mar. 6, 1980

Related U.S. Application Data

[63] Continuation of Ser. No. 43,403, May 29, 1979, abandoned.

[30] Foreign Application Priority Data

May 31, 1978 [NL] Netherlands .......................... 7805893

[51] Int. Cl.³ ........................... A23D 3/00; A23D 5/00
[52] U.S. Cl. ..................................... 426/603; 426/607
[58] Field of Search ............................... 426/606, 607

[56] References Cited

U.S. PATENT DOCUMENTS

| | | | |
|---|---|---|---|
| 2,996,388 | 8/1961 | Lindsay ............................... | 426/607 |
| 3,353,964 | 11/1967 | Seiden ................................. | 426/607 |
| 3,592,661 | 7/1971 | Seiden ................................. | 426/607 |
| 3,600,195 | 8/1971 | Westenberg ......................... | 426/607 |
| 4,055,679 | 10/1977 | Kattenberg et al. ................ | 426/607 |

FOREIGN PATENT DOCUMENTS 1139550 1/1969 United Kingdom .

*Primary Examiner*—Robert A. Yoncoskie
*Attorney, Agent, or Firm*—Milton L. Honig; James J. Farrell

[57] ABSTRACT

The invention is concerned with a fat blend that is suitable for the preparation of refrigerator-type margarines and low fat spreads. The fat blend contains at least 35% by weight of a randomly interesterified mixture of 20-80 parts by weight of an oil liquid at refrigerator temperature and 80-20 parts by weight of an oil that is rich in lauric acid residues.

Preferably the fat blend contains up to 80% of said interesterified mixture. Furthermore, oils liquid at refrigerator temperature, oils of a melting point of 20°-35° C., e.g. 20-50%, and fats of a melting point of 40°-45° C., e.g. 5-20%, may be present.

7 Claims, No Drawings

FAT BLEND SUITABLE FOR REFRIGERATOR-TYPE MARGARINES AND LOW FAT SPREADS

This is a continuation application of Ser. No. 043,403 filed May 29, 1979, now abandoned.

The present invention relates to a fat blend that is suitable for the preparation of refrigerator-type margarines and low fat spreads (the latter being emulsions similar to margarine, however of a much lower fat content e.g. 35–65% by weight). Refrigerator-type margarines and low fat spreads are water-in-oil type emulsions which are easily spreadable after having been stored in a refrigerator at a temperature of about 5°–10° C. The spreadability of such emulsions at refrigerator temperature is mainly determined by the content of fat crystals present in the fatty phase of the product at 5° and 10° C. A measurement for the solid phase content is the dilatation value, which is normally measured with the aid of a dilatometer, as described in H. A. Boekenoogen, "Analysis and Characterization of Oils, Fats and Fat Products", Volume I, 1964, Interscience Publishers, page 143 et seq. Usual dilatation values for a refrigerator-type margarine or low fat spread are the following:

at 10° C.: not more than 700, preferably not more than 600;
at 20° C.: between 100 and 400, preferably between 150 and 350;
at 30° C.: not more than 150, preferably between 50 and 100; and
at 35° C.: not more than 50, preferably not more than 30.

The dilatation value at 20° C. determines the consistency of the product at or around room temperature, which temperature the product will get when used, after it has been removed from the refrigerator for some time. The dilatation values at 30° and 35° C. determine the degree to which the product will melt in the mouth, and when the values at these temperatures are too high the product will leave behind an unpleasant fatty taste impression.

In view of the dilatation requirements of refrigerator-type margarines and low fat spreads, normally a fat blend is used that gives the desired solid phase content at room temperature, i.e. 20° C., without the solid phase content becoming unacceptably high at either refrigerator temperature, i.e. 10° C. at most, or body temperature, i.e. about 35° C. A blend of e.g. an oil liquid at refrigerator temperature, an oil solid at refrigerator temperature but liquid at body temperature, as well as a fat that at temperatures round body temperature still has a certain content of solid phase, can for example be used for such products.

According to Andersen and Williams, "Margarine", 2nd revised edition, Pergamon Press, 1965, page 316, the content of oil liquid at refrigerator temperature in such products can be 55–65% calculated on the fat blend.

The oil that is liquid at body temperature but at least partly crystallized at refrigerator and room temperature can be, for example, a partially hydrogenated oil consisting predominantly of triglycerides of fatty acids having 16 to 18 carbon atoms (for example soyabean oil with a melting point of 25°–30° C.) and/or an oil that is rich in lauric acid residues, such as coconut oil, palm kernel oil or babassu oil. Because of the dilatation requirements at refrigerator and room temperature, it has been a problem to use more than 15–20% by weight of oils that are rich in lauric acid residues in such products.

Nevertheless, it can be desirable from time to time, e.g. for reasons of economy, to use greater quantities of oils that are rich in lauric acid residues.

According to the present invention, a fat blend is provided containing at least 35% by weight, based on the total weight of the fat blend, of a randomly interesterified mixture of, on the one hand, 20–80 parts by weight of an oil liquid at refrigerator temperature and, on the other hand, 80–20 parts by weight of an oil that is rich in lauric acid residues, and further such oils and fats that the fat blend fulfils the previously described dilatation requirements.

Such a fat blend will, with respect to the dilatation requirements, conform to the above-mentioned criteria and moreover contain a relatively large quantity of oils that are rich in lauric acid residues.

The amount of the interesterified component in the fat blend can be up to 80% and the remainder of the fat blend can consist of one or more oils that are liquid at refrigerator temperature and/or fats with a melting point in the range between 20° and 45° C.; the melting point of the latter fats and the relative proportions of those fats and oils should, of course, be adapted to the amount of the randomly interesterified component on the one hand and, on the other hand, to the weight ratio between the ingredients from which the interesterified component was prepared.

Surprisingly it has appeared that in the range between 10° and 20° C. the steepness of the dilatation curve of the randomly interesterified component is less than the steepness of an equivalent mixture that was not interesterified. Preferably an interesterified component was used in which the weight ratio between, on the one hand, the oil liquid at refrigerator temperature and, on the other hand, the oil that is rich in lauric acid residues lies in the range between 30–70, particularly 40 and 60 parts by weight of the first oil and 70–30, particularly 60 and 40 parts by weight of the other oil. In this range, namely, the randomly interesterified mixture exhibits the smallest difference between the dilatation values at 20° and 10° C., which is of essential importance because the product will often be used by the consumer in that temperature range and a great difference in the degree of spreadability can be experienced as annoying.

In British Patent Specification No. 1,139,550, Example 2, it is disclosed to add to a margarine fat 41% by weight of a randomly interesterified mixture of equal parts of coconut oil and soyabean oil, however the margarine fat described also contained a considerable amount of a randomly interesterified mixture of coconut oil and palm oil in order to give the product a butter-like consistency (see page 1, left-hand column, lines 25–26). As such products have at 10° and 20° C. dilatations which are unacceptably high for refrigerator-type margarines and low fat spreads, it was all the more surprising that a component of a butter-like margarine was suitable for a refrigerator-type margarine or low fat spread.

The amount of the interesterified component in the fat blend of the present invention is preferably from 40–70% by weight. Suitable fats which can be used along with the randomly interesterified component without the desired dilatation values being adversely affected are for example oils that are liquid at refrigerator temperatures such as soyabean oil, sunflower oil, safflower oil, olive oil, etc., e.g. up to 35% by weight of the fat blend, oils with a melting point between 20° and 35° C., such as coconut oil, palm kernel oil, palm oil, partially hardened vegetable oils, fractionated fats, etc. Such oils and fats or mixtures thereof can be used in an amount of up to 50%, e.g. 20-50%. Besides these, fats with a melting point of 40°-45° C. can be used; a suitable amount of these latter fats is 5-20%.

In a most preferred embodiment of the invention the fat blend is composed of the randomly interesterified component, an oil liquid at refrigerator temperature and a fat of a melting point of 40°-45° C. only, since such a fat blend, which may contain up to 35 or 40% of lauric-type fats, shows the smallest difference in dilatation values of 10° and 20° C.

The invention will now be illustrated with reference to the following Examples, in which all percentages are by weight of the fat blend.

EXAMPLES I-X

Fat blends suitable for the preparation of refrigerator-type margarines and low fat spreads were prepared by mixing a number of fats and oils in proportions indicated in the accompanying Table. The dilatation values obtained are also mentioned in the Table.

| Example | I | II | III | IV | V | VI | VII | VIII | IX | X |
|---|---|---|---|---|---|---|---|---|---|---|
| soyabean oil | — | 4 | — | — | — | — | — | — | 20 | 10 |
| soyabean oil hardened to 29° C. | 16 | 9 | 18 | 20 | 24 | 29 | — | — | — | — |
| coconut oil | 10 | 19 | 15 | 15 | 15 | 15 | 15 | 15 | — | 10 |
| palm oil | — | 20 | 15 | 12 | 7 | — | — | 7 | — | 10 |
| palm oil olein (slip m.p. 23° C.) | 10 | — | — | — | — | — | 7 | — | — | — |
| palm oil hardened to 43° C. | — | 11 | 9 | 10 | 11 | 13 | 14 | 14 | 14 | 10 |
| randomly interesterified mixture of 70 parts soyabean oil and 30 parts coconut oil | 64 | 37 | 43 | 43 | 43 | 43 | 64 | 64 | — | — |
| randomly interesterified mixture of 50 parts soyabean oil and 50 parts coconut oil | — | — | — | — | — | — | — | — | 66 | 60 |
| dilatations at: 10° C. | 404 | 516 | 450 | 448 | 435 | 425 | 454 | 469 | 370 | 450 |
| 20° C. | 110 | 198 | 162 | 167 | 164 | 170 | 159 | 176 | 180 | 170 |
| 30° C. | 23 | 80 | 63 | 65 | 64 | 67 | 51 | 66 | 50 | 50 |
| 35° C. | 5 | 24 | 18 | 20 | 21 | 24 | 15 | 20 | 30 | 25 |

We claim:

1. Fat blend that is suitable for the preparation of refrigerator-type margarines and low fat spreads containing at least 35% by weight, based on the total weight of the fat blend, of a randomly interesterified mixture of 20-80 parts by weight of an oil liquid at refrigerator temperature and 80-20 parts by weight of an oil that is rich in lauric acid residues, and further such oils and fats that the dilatation values of said blend are:
   at 10° C.: not more than 600,
   at 20° C.: between 100 and 350,
   at 30° C.: between 50 and 100,
   at 35° C.: not more than 30.

2. Fat blend according to claim 1, in which the amount of interesterified component is up to 80%.

3. Fat blend according to claim 1, in which in the interesterified component the weight ratio between the oil liquid at refrigerator temperature and the oil that is rich in lauric acid residues is 70-30:30-70.

4. Fat blend according to claim 1, further containing up to 50% by weight of fats with a melting point of 20°-35° C. and up to 35% of oils liquid at refrigerator temperature.

5. Fat blend according to claim 1, further containing 5-20% by weight of fats with a melting point of 40°-45° C.

6. Fat blend according to claim 1, consisting of the randomly interesterified mixture, and oil liquid at refrigerator temperature and a fat of a melting point of 40°-45° C.

7. Margarine or low fat spread prepared from the fat blends according to claim 1.

* * * * *